United States Patent Office 3,374,240
Patented Mar. 19, 1968

3,374,240
SUBSTITUTED 1,2,4-THIADIAZOLIDIN-3,5-DIONES AND PROCESS THEREFOR
Gerhard F. Ottmann, Hamden, and Haywood Hooks, Jr., West Haven, Conn., assignors to Olin Mathieson Chemical Corporation, New Haven, Conn., a corporation of Virginia
No Drawing. Continuation-in-part of applications Ser. No. 411,638, Nov. 16, 1964, and Ser. No. 427,088, Jan. 21, 1965. This application June 29, 1965, Ser. No. 468,121
4 Claims. (Cl. 260—306.7)

This application is a continuation-in-part of Ser. No. 411,638, filed Nov. 16, 1964, now Patent No. 3,301,894, and of Ser. No. 427,088, filed Jan. 21, 1965 now abandoned.

This invention relates to a series of substituted 1,2,4-thiadiazolidin-3,5-diones, and more particularly it relates to cyclic derivatives having the following general formula:

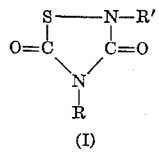

(I)

wherein both R and R' are either alkyl, cycloalkyl, aryl, substituted aryl or benzyl.

It has recently been established that S-chloro isothiocarbamyl chlorides react with a wide variety of isocyanates to provide S-[N'-(chlorocarbonyl) - amino] isothiocarbamyl chlorides, and the preparation of these latter derivatives is thoroughly described and disclosed in the aforementioned copending application S.N. 411,638. These reactions proceed in accordance with the following equation wherein R and R' are as represented in the preceding discussion.

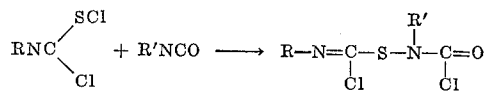

It has now been found that the heretofore unknown cyclic derivatives (I) are provided in high yield and purity by the reaction of the S - [N' - (chlorocarbonyl)-amino] isothiocarbamyl chlorides with water. An efficient process for the preparation of the compounds (I) has been provided and is disclosed herein. The substituted 1,2,4-thiadiazolidin-3,5-diones (I) are prepared in accordance with the following equation.

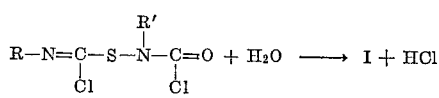

Although the cyclic derivatives (I), wherein R and R' are as previously represented, are readily prepared in accordance with the disclosure herein, preferred embodiments of this invention include those compounds of the general Formula I wherein both R and R' are independently selected from the class consisting of alkyl having 1–18 carbon atoms, cycloalkyl having 5–7 carbon atoms, aryl having 6–10 carbon atoms, halogenated phenyl, nitrated phenyl, benzyl and phenyl having a lower alkoxy (1–3 carbon atoms) substituent. The preparation of the particular S-[N' - (chlorocarbonyl) - amino] isothiocarbamyl chlorides which can be converted to these preferred embodiments is described in detail in our copending application Ser. No. 411,638.

The cyclic derivatives (I) are obtained by treating the S-[N'-(chlorocarbonyl) - amino] isothiocarbamyl chlorides with water and isolating the desired products. Although the process can be readily carried out at a temperature range of about 0° C. to 100° C., generally a preferred reaction temperature range of about 20°–40° C. should be employed. Isolation of the cyclic compounds (I) is accomplished by conventional procedures including, for example, extraction, distillation and filtration techniques.

The substituted 1,2,4-thiadioazolidin-3,5-diones of this invention are valuable agricultural chemicals especially as foliar and soil fungicides. The cyclic derivatives (I) have also been found to be useful nematocides, and several of the novel cyclic compounds are quite active herbicides. Generally in these applications, they are utilized in the form of mixtures with carriers and diluents known to those skilled in this art. For instance, they can be admixed with solid carriers to form active powders and dusts. They are also readily formulated in the form of emulsion concentrates suitable for dilution with water when admixed with appropriate organic solvents and emulsifying agents.

The following examples will serve to illustrate the preparation of several of the substituted 1,2,4-thiadiazolidin-3,5-diones (I) in accordance with this invention.

Example 1

An amount of 40.0 g. of N-butyl-S-[N'-(chlorocarbonyl)-butylamino] isothiocarbamyl chloride was added increment-wise and with vigorous stirring over a period of 15 minutes to 300 ml. of water which was heated to 70° C. When the addition was completed the reaction mixture was agitated for 15 more minutes at the said temperature and then was cooled to room temperature. The organic layer was separated by extraction with ether. The ethereal solution was dried with potassium carbonate, filtered, and the solvent evaporated. The residue was distilled yielding 25.0 g. (77.5% of the theory) of 2,4-di-butyl-1,2,4-thiadiazolidin - 3,5 - dione (B.P. 111° C./0.6 mm., $n_D{}^{25}$ 1.4960) in the form of a colorless liquid.

*Analysis.*—Calcd. for $C_{10}H_{18}N_2O_2S$: C, 52.14; H, 7.94; N, 12.30; S, 14.23. Found: C, 52.14; H, 7.88; N, 12.18; S, 13.90.

Example 2

An amount of 30.0 g. of N-phenyl S-[N'-(chlorocarbonyl)-ethylamino] isothiocarbamyl chloride was added increment-wise with agitation over a period of 30 minutes to 300 ml. of water at 25° C. The very exothermic reaction raised the temperature of the reaction mixture to 55° C. After complete addition, the mixture was boiled for a short period and then cooled to 0° C. A precipitate was separated by filtration, and purified by recrystallization from n-hexane yielding 22.0 g. of 2-ethyl-4-phenyl-1,2,4-thiadiazolidin-3,5-dione, M.P. 94° C., in the form of white needles.

*Analysis.*—Calcd. for $C_{10}H_{10}N_2O_2S$: C, 54.05; H, 4.53; N, 12.61; S, 14.40. Found: C, 54.06; H, 4.49; N, 12.39; S, 14.75.

Example 3

An amount of 39.0 g. of N-phenyl S-[N'-(chlorocarbonyl)-p-tolylamino] isothiocarbamyl chloride was treated with water as described in Example 2. A solid precipitate was removed by filtration, dried in vacuo, and recrystallized from 800 ml. of n-heptane. Yield: 25.0 g. of 2-(p-tolyl)-4-phenyl-1,2,4-thiadiazolidin-3,5-dione, M.P. 134°–135° C., in the form of white, silky needles.

*Analysis.*—Calcd. for $C_{15}H_{12}N_2O_2S$: C, 63.37; H, 4.23; N, 9.86; S, 11.25. Found: C, 63.89; H, 4.42; N, 10.04; S, 11.36.

Examples 4–10

Using procedures similar to those employed in Examples 1–3, many other substituted 1,2,4-thiadiazolidin-3,5-diones included in the general Formula I have been prepared in high yield and purity. Several of these prepared derivatives are tabulated in the following table.

| Compound Prepared | M.P., °C. | Yield, Percent |
|---|---|---|
| 2-octyl-4-ethyl-1,2,4-thiadiazolidin-3,5-dione | (¹) | 76 |
| 2-isopropyl-4-phenyl-1,2,4-thiadiazolidin-3,5-dione | 112-113 | 95 |
| 2-butyl-4-phenyl-1,2,4-thiadiazolidin-3,5-dione | 81-82 | 90 |
| 2-octyl-4-phenyl-1,2,4-thiadiazolidin-3,5-dione | 70-71 | 86 |
| 2,4-diphenyl-1,2,4-thiadiazolidin-3,5-dione | 114-115 | 84 |
| 2-(p-chlorophenyl)-4-phenyl-1,2,4-thiadiazolidin-3,5-dione | 170 | 81 |
| 2-(p-methoxyphenyl)-4-phenyl-1,2,4-thiadiazolidin-3,5-dione | 157-158 | 85 |

¹ B.P. 134° C./0.6 mm.

The ring structure of the compounds disclosed herein has been confirmed by several procedures. The products, formed by the reaction of the S-[N'-(chlorocarbonyl)-amino] isothiocarbamyl chlorides with water, are reduced by reaction with lithium aluminum hydride to provide in every instance the corresponding N,N'-disubstituted ureas in good yield. Moreover mass spectroscopy analysis has confirmed that the substituted 1,2,4-thiadiazolidin-3,5-diones (I) have been obtained.

What is claimed is:

1. A compound of the formula

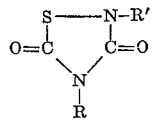

wherein R is aryl of 6–10 carbon atoms and R' is phenyl having a lower alkoxy substituent.

2. 2-p-methoxyphenyl)-4-phenyl-1,2,4 - thiadiazolidin-3,5-dione.

3. A process for preparing substituted 1,2,4-thiadiazolidin-3,5-diones which comprises reacting S-[N'-(chlorocarbonyl)-amino] isothiocarbamyl chlorides with water and isolating the substituted 1,2,4 - thiadiazolidin - 3,5-diones.

4. A process for preparing substituted 1,2,4-thiadiazolidin-3,5-diones which comprises reacting:
   (a) S-[N' - (chlorocarbonyl) - amino] isothiocarbamyl chlorides of the formula

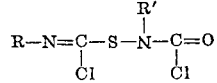

wherein both R and R' are independently selected from the class consisting of alkyl having 1–18 carbon atoms, cycloalkyl having 5–7 carbon atoms, aryl having 6–10 carbon atoms, halogenated phenyl, nitrated phenyl, benzyl and phenyl having a lower alkoxy substituent; with
   (b) water at a temperature range of about 0° C. to 100° C., and separating said -3,5-diones from the reaction mixture.

References Cited

UNITED STATES PATENTS 2,863,803  12/1958  Benghiat et al. _____ 167—33

OTHER REFERENCES

Bradsher et al.: J. Am. Chem. Soc., vol. 80, pages 414–417 (1958).

Elderfield: Heterocyclic Compounds, vol. 7 (New York, 1961), pages 563, 567, and 575.

ALTON D. ROLLINS, *Primary Examiner.*